(12) United States Patent
Kang et al.

(10) Patent No.: US 8,799,825 B2
(45) Date of Patent: Aug. 5, 2014

(54) 3D INTERFACE APPARATUS AND INTERFACING METHOD USING THE SAME

(75) Inventors: Jung-min Kang, Seoul (KR); Seong-il Cho, Seoul (KR); Young-kwang Seo, Seoul (KR); Ki-jun Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 12/486,183

(22) Filed: Jun. 17, 2009

(65) Prior Publication Data

US 2010/0125817 A1 May 20, 2010

(30) Foreign Application Priority Data

Nov. 14, 2008 (KR) .......................... 10-2008-113254

(51) Int. Cl.
*G06F 3/033* (2013.01)
(52) U.S. Cl.
USPC .......................................... 715/863; 715/848
(58) Field of Classification Search
USPC ................................. 715/863, 848
See application file for complete search history.

(56) References Cited

U.S. PATENT DOCUMENTS

| 6,244,987 | B1 | 6/2001 | Ohsuga et al. |
| 6,310,604 | B1 * | 10/2001 | Furusho et al. ............... 345/156 |
| 2007/0176898 | A1 * | 8/2007 | Suh .............................. 345/158 |
| 2008/0059138 | A1 * | 3/2008 | Tremblay et al. .............. 703/11 |
| 2010/0234094 | A1 * | 9/2010 | Gagner et al. ................. 463/20 |

OTHER PUBLICATIONS

"3D Modeling Interface with Air Spray: Field Study of 3DModel Making and Prototype Development" by Hee-kyoung Jung, Tek-jin Nam, Ho-sung Lee (hereinafter Jung) published Apr. 2005 also available at http://courses.ischool.berkeley.edu/i213/s05/resources/p2162.pdf.*
Communication dated Feb. 6, 2012 issued by the European Patent Office in counterpart European Patent Application No. 09164763.6.

* cited by examiner

*Primary Examiner* — Peiyong Weng
(74) *Attorney, Agent, or Firm* — Sughrue Mion, PLLC (57) ABSTRACT

A 3D interface apparatus which is operated based on motion and an interfacing method using the same are provided. The interface apparatus includes a motion sensor, a controller which determines a wind property, and a wind generation module which generates a wind. Accordingly, a user is allowed to manipulate a GUI more easily, conveniently, and intuitively.

16 Claims, 7 Drawing Sheets

3D INTERFACE APPARATUS AND INTERFACING METHOD USING THE SAME

CROSS-REFERENCE TO RELATED APPLICATIONS

This application claims priority from Korean Patent Application No. 10-2008-113254, filed on Nov. 14, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a three-dimensional (3D) interface and interfacing, and more particularly, to a 3D interface apparatus which is operated based on motion and an interfacing method using the same.

2. Description of the Related Art

As functions of electronic devices become diversified, most of the electronic devices are executed upon receiving a command from a user through a graphic user interface (GUI).

However, since such an electronic device simply receives a command from a user and is merely operated according to the received command, the user does not learn whether the user command is correctly input or not until the electronic device is executed.

Accordingly, there is a demand for a method for allowing a user to intuitively learn whether a correct command is input or not by providing action corresponding to a user command at the same time of receiving the user command.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiment of the present invention provides a 3D interface apparatus which allows a user to manipulate a graphic user interface (GUI) more easily, conveniently, and intuitively, and an interfacing method using the same.

Consistent with an aspect of the present invention, a motion-based interface apparatus comprises a motion sensor which senses motion in a 3D space, a controller which determines a wind property based on the motion, and a wind generation module which generates a wind according to the determined wind property.

The controller may determine the wind property based on at least one of direction, speed, scale, position, and shape of the motion.

The wind property may comprise a property regarding at least one of strength, temperature, smell, component, and direction of the wind.

The interface apparatus may further comprise a display unit, and the controller may change a scene displayed on the display unit based on the motion.

The motion sensor may be disposed at one side of the display unit to sense motion in the 3D space formed above the other side of the display unit.

The controller may determine the wind property based on a combination of a scene output on the display unit and the motion.

The motion sensor may sense motion of a plurality of objects, and the controller may determine the wind property by comparing the motion of the plurality of objects.

The interface apparatus may further comprise a storage unit which stores a property corresponding to the motion, and the controller may generate the wind based on the stored property.

Consistent with another aspect of the present invention, an interfacing method which is performed based on motion sensed by a motion sensor, comprises sensing motion in a 3D space, determining a wind property based on the motion, and generating a wind according to the determined property.

The determining operation may determine the wind property based on at least one of direction, speed, scale, position, and shape of the motion.

The wind property may comprise a property regarding at least one of strength, temperature, smell, component, and direction of the wind.

The determining operation may determine the wind property based on a combination of a scene output on a display and the motion.

The sensing operation may comprise sensing motion of a plurality of objects, and the determining operation may determine the wind property by comparing the motion of the plurality of objects.

The generating operation may generate the wind based on a pre-stored property corresponding to the motion.

Additional and/or other aspects of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
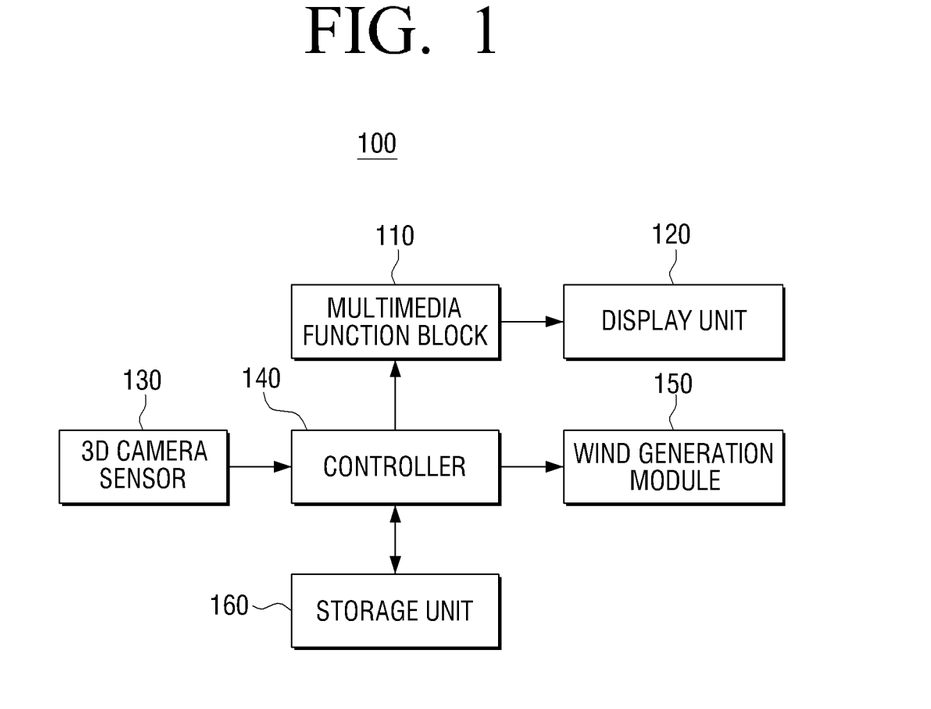
FIG. 1 is a block diagram of an interface apparatus consistent with an exemplary embodiment of the present invention.

FIG. 1 is a block diagram of an interface apparatus 100 according to an exemplary embodiment of the present invention.

The interface apparatus 100 senses dynamic motion of a user and determines the wind property based on the sensed motion. Also, the interface apparatus 100 generates a wind according to the determined property and provides the wind to the user. In an exemplary embodiment, the wind is an artificial movement of air.

As shown in FIG. 1, the interface apparatus 100 comprises a multimedia function block 110, a display unit 120, a 3D camera sensor 140, a controller 140, a wind generation module 150, and a storage unit 160.

The multimedia function block 110 generates a scene for display on the display unit 120, according to interface manipulation by the user. The multimedia function block 110 generates a GUI including menu items or content items to display a scene corresponding to the interface manipulation, and performs a function corresponding to the interface manipulation such as reproducing contents such as a motion picture, a still image, music, and text.

The display unit 120 displays the GUI generated by the multimedia function block 110 and the contents reproduced by the multimedia function block 110.

The 3D camera sensor 130 functions to receive interface manipulation by receiving 3D motion of a user. The 3D camera sensor 130 mainly senses interface manipulation by sensing movement of user's finger and transmits information regarding sensed motion to the controller 140. The information regarding sensed motion may include 3D coordinate information of motion and shape information of motion, which will be described later.

The wind generation module 150 generates a wind according to the wind property determined by the controller 140 and provides the wind to the user. The wind generation module 150 comprises a fan (not shown) to generate a wind with power supplied and an exhaust hole (not shown) to exhaust the wind to the outside therethrough. The exhaust hole (not shown) may be formed at four corners of the display unit 120. Also, the exhaust hole (not shown) may be provided with the display unit 120, thereby providing a wind at the same time of displaying a scene.

The storage unit 160 is a storage medium to store programs required to drive the interface apparatus 100, and may be realized as a memory or a hard disk drive (HDD).

The storage unit 160 stores the type of a control command corresponding to motion as a lookup table, and the controller 140 determines the wind property in a pre-set method based on the type of a control command stored in the storage unit 160.

The controller 140 generates a control command based on motion sensed by the 3D camera sensor 130. More specifically, the controller 140 extracts 3D coordinate information and shape information regarding the sensed 3D motion and generates a control command based on the extracted 3D coordinate information and shape information.

The 3D coordinate information of motion refers to coordinate information regarding motion sensed within the sensing range of the 3D camera sensor 130. For example, if motion of a user is from point "A" to point "B" in a 3D space and if the coordinates of point "A" is (0,1,2) and the coordinates of point "B" is (2,4,6), coordinate information regarding the motion indicates the final position (2,4,6) or variation (2,3,4) between the initial position and the final position.

The shape information of motion refers to information regarding the shape of motion sensed within the sensing range of the 3D camera sensor 130. For example, if a user "C" clenches his/her fist, the shape information of this motion is 'fist'.

As described above, the controller 140 determines motion information such as direction, speed, scale, position, and shape of motion based on the 3D coordinate information and the shape information of motion, and generates a control command corresponding to the motion information.

First, the controller 140 generates a control command to determine only the wind property based on only the motion information. The wind property refers to a property regarding at least one of the strength, temperature, smell, component, and direction of wind.

In order to determine a property regarding the strength of wind, the interface apparatus 100 according to an exemplary embodiment of the present invention may use a method of changing a rotational speed of the fan (not shown) according to an input signal. That is, the interface apparatus 100 may strongly operate the fan (not shown) to generate a strong wind and weakly operate the fan (not shown) to generate a gentle wind.

Also, in order to determine a property regarding the temperature of wind, the interface apparatus 100 according to an exemplary embodiment of the present invention may further comprise a cooling module (not shown) and a heating module (not shown) around the wind generation module 150. That is, the interface apparatus 100 may supply power to the heating module (not shown) to heat the wind generated by the wind generation module 150 and generate a warm wind. Also, the interface apparatus 100 may supply power to the cooling module (not shown) to cool the wind generated by the wind generation module 150 and generate a cold wind.

Also, in order to determine a property regarding the smell or component of wind, the interface apparatus 100 according to an exemplary embodiment of the present invention may further comprise a smell holding device (not shown) or a component holding device (not shown) around the wind generation module 150. That is, the interface apparatus 100 opens a lid of the smell holding device (not shown) or the component holding device (not shown) to generate a smelling wind which contains a smell or component held in the smell holding device (not shown) or the component holding device (not shown).

Also, in order to determine a property regarding the direction of wind, the interface apparatus 100 according to an exemplary embodiment of the present invention may change the direction of the fan (not shown) or may comprise a plurality of fans (not shown) provided in various directions. That is, in order to exhaust the wind in various directions, the interface apparatus 100 drives only a fan (not shown) provided in a desired direction or change the direction of the fan (not shown) to a desired direction.

Figure 2:
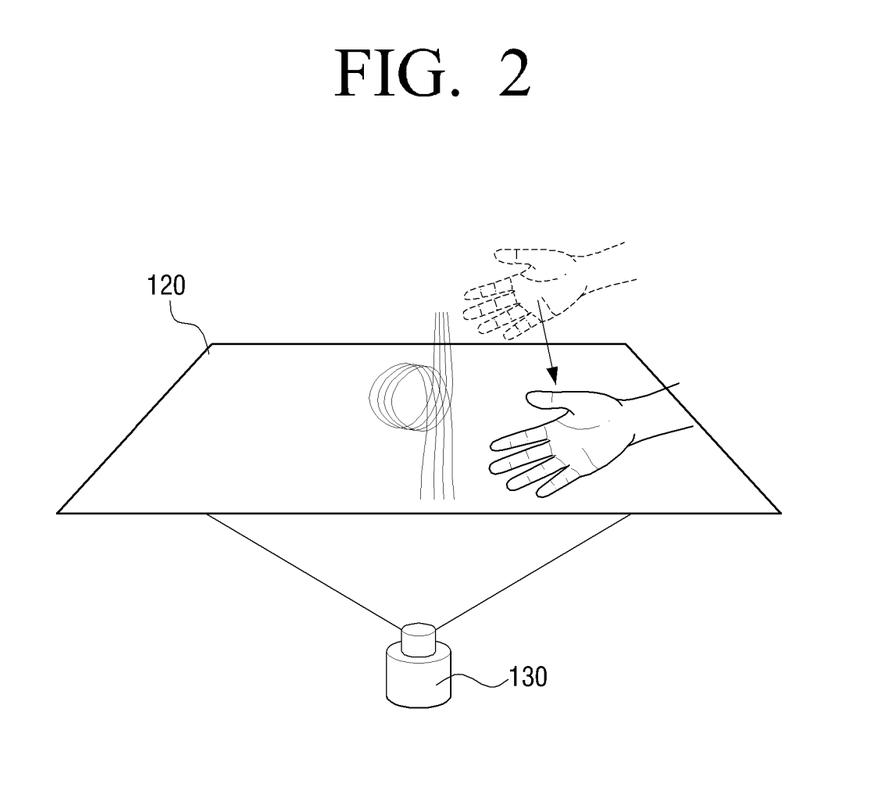
FIG. 2 is a view illustrating a state in which a wind is generated based on motion information.

FIG. 2 is a view illustrating a state in which a wind is generated based on motion information. As shown in FIG. 2, if a user moves the palm of his/her hand from rear side to front side of the display unit 120, the 3D camera sensor 130 located under the display unit 120 senses this motion.

The controller 140 determines the wind property based on sensed motion information, and controls the wind generation module 150 to generate a wind according to the determined property.

In this case, the wind property moves from front side to rear side of the display unit 120, that is, in a direction opposite the motion direction of the palm of the user's hand. The wind is generated in the direction opposite the motion direction of the user so that the user feels the wind more effectively.

The controller 140 may determine different properties of wind depending on the speed, scale, position, and shape of user's motion. For example, if the palm of the user's hand moves more quickly from rear side to front side of the display unit 120, the controller 140 may generate a stronger wind compared to the case that the palm of the user's hand moves slowly.

Figure 3:
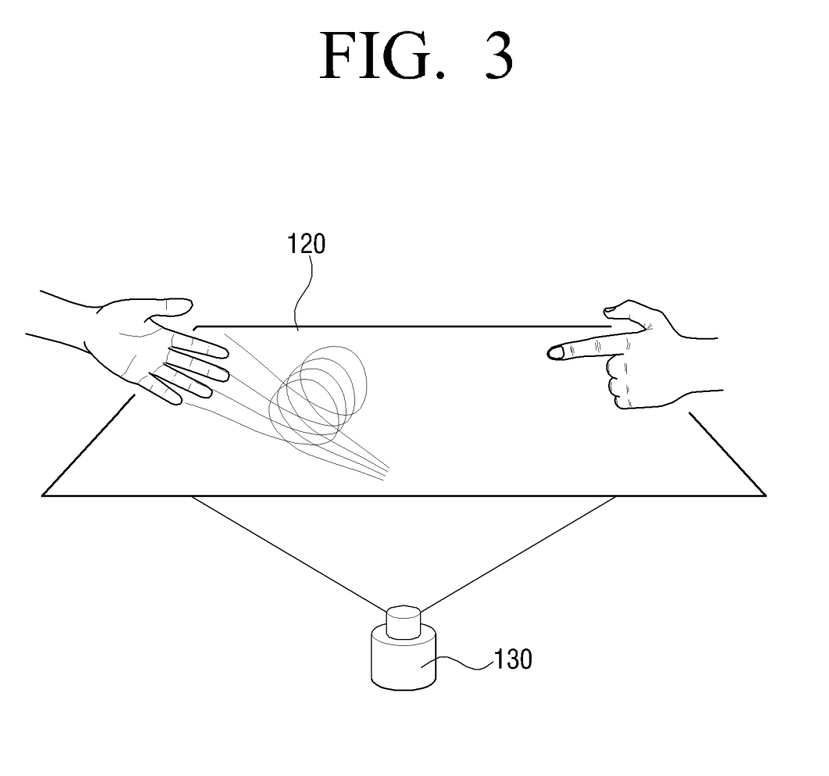
FIG. 3 is a view illustrating a state in which a wind is generated based on a plurality of motion information.

FIG. 3 is a view illustrating a state in which a wind is generated based on motion of a plurality of objects.

As shown in FIG. 3, if two users play the Rock-Paper-Scissor game, the 3D camera sensor 130 senses a shape of a plurality of objects. In an exemplary embodiment, the plurality of objects are a plurality of hands. That is, the 3D camera sensor 130 extracts a shape corresponding to the hand sign "Paper" and a shape corresponding to the hand sign "Scissor", respectively, and the controller 140 determines the wind property based on the extracted two types of shapes. In an exemplary embodiment, the shapes are static. In another exemplary embodiment, the shapes are static hand gestures.

Accordingly, as shown in FIG. 3, the controller 140 determines the wind property regarding the direction of the side which is defeated, and the wind generation module 140 exhausts a wind toward the side which is defeated, as a penalty given to the loser.

Also, the controller 140 generates a control command to determine the wind property based on both the scene information displayed on the display unit 120 and the motion information. Detailed description thereof is provided with reference to FIG. 4 below.

Figure 4:
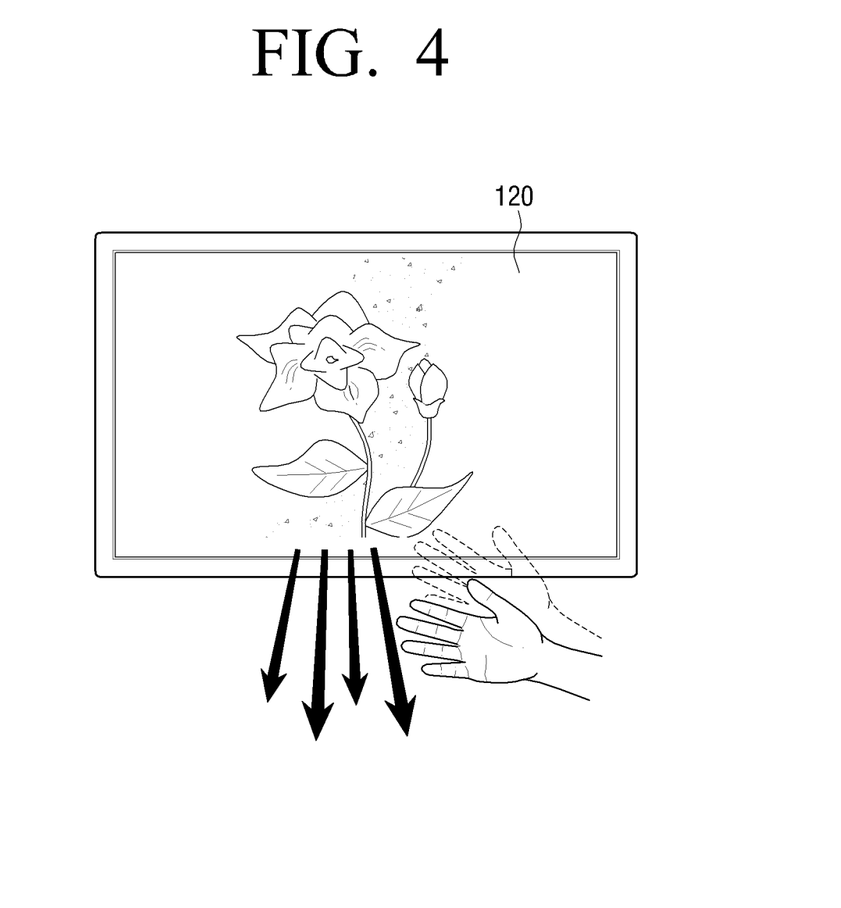
FIG. 4 is a view illustrating a state in which a smell-added wind is generated based on scene information and motion information.

FIG. 4 is a view illustrating a state in which a smell-added wind is generated based on the scene information and the motion information. As shown in FIG. 4, if a rose scene is displayed on the display unit 120 and if a user makes a gesture of smelling the rose, the controller 140 may generate a wind including a rose fragrance.

That is, the controller 140 generates the rose fragrance-added wind based on the scene information indicating the rose scene and the motion information indicating that the user makes a gesture of smelling the rose.

Figure 5:
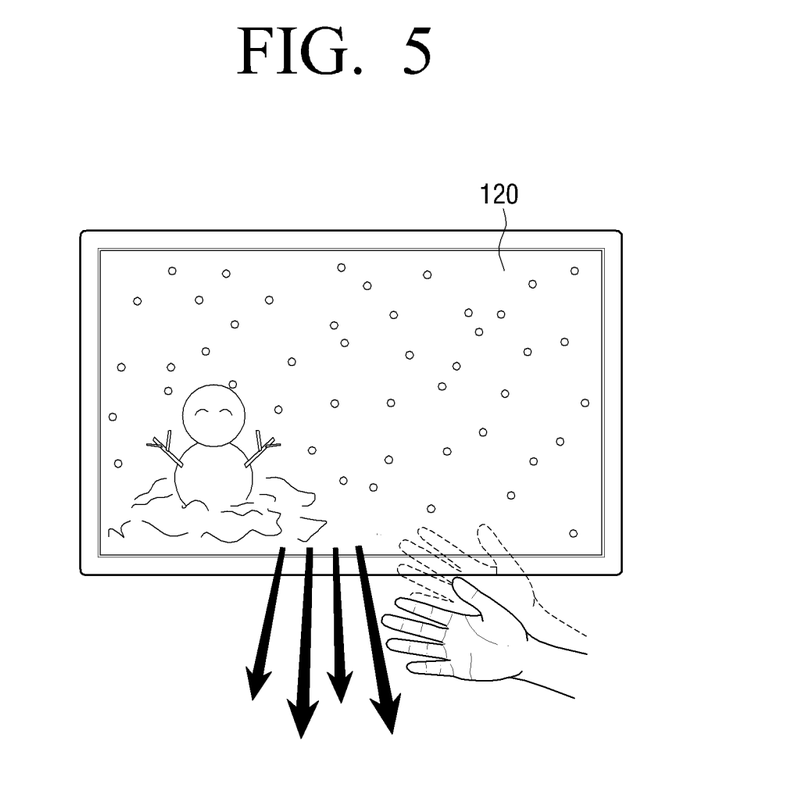
FIG. 5 is a view illustrating a state in which a wind the temperature of which has changed is generated based on scene information and motion information.

FIG. 5 is a view illustrating a state in which a cold wind is generated based on the scene information and the motion information. As shown in FIG. 5, if the display unit 120 displays a snowy scene and if a user makes a gesture of waving his/her hand, the controller 140 generates a cold wind.

That is, the controller 140 generates a cold wind based on the scene information indicating a snowy scene and the motion information indicating user's gesture of waving hand.

Although the case where the smell and temperature of the wind is changed is explained with reference to FIGS. 4 and 5, this is merely an example. The present invention is applicable to the case where the strength, component or direction of the wind is changed based on the scene information and the motion information.

Also, the controller 140 may generate a control command to change a scene displayed on the display unit 120 based on the motion information at the same time of determining the wind property based on the motion information. Detailed description thereof is provided with reference to FIG. 6 below.

Figure 6:
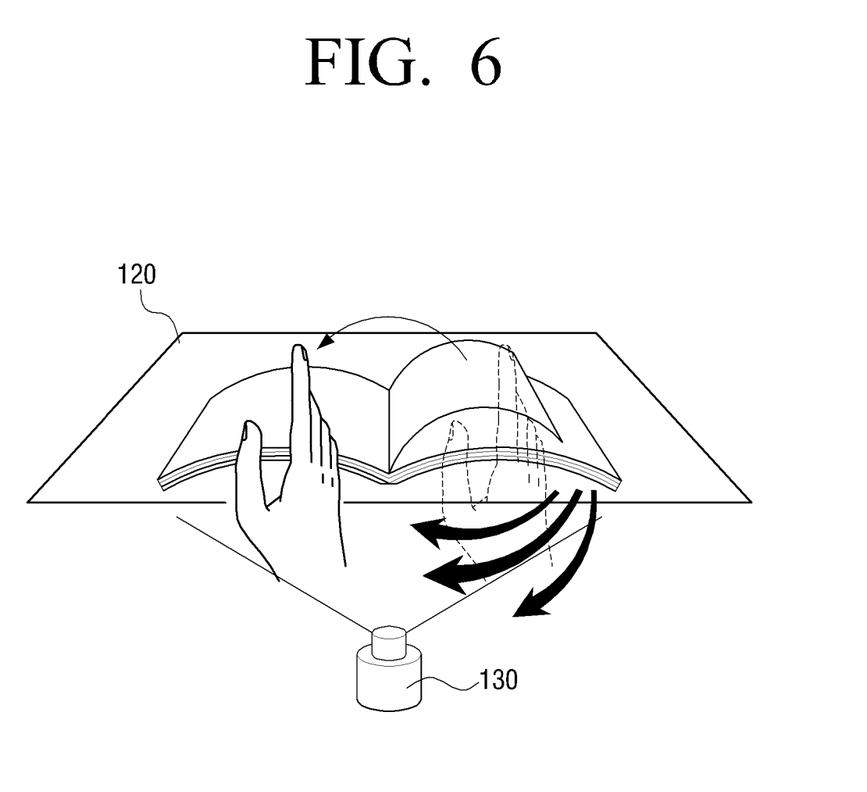
FIG. 6 is a view illustrating a state in which a wind is generated and a scene is changed based on motion information.

FIG. 6 is a view illustrating a state in which a wind is generated and a scene is changed based on motion information. In FIG. 6, if a book scene is displayed on the display unit 120 and a user makes a gesture of turning a page of the book, a wind is generated and the scene is changed.

If the user makes a gesture of turning a page of the book within the sensing range of the 3D camera sensor 130 over the book scene displayed on the display unit 120, the controller 140 controls the display unit 120 to display a scene in which the page of book is turned and controls the wind generation module 150 to generate a wind in the direction of turning the page of the book.

That is, the wind is generated in the direction of turning the page based on the motion information indicating the user's gesture of turning the page, and simultaneously, the scene showing the page is turned is displayed.

Figure 7:
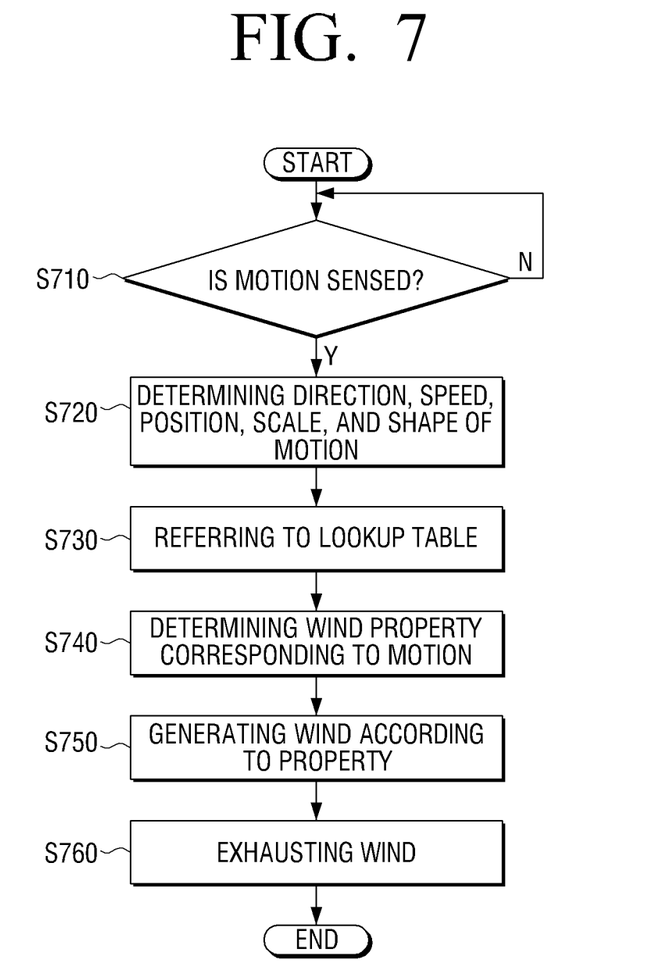
FIG. 7 is a flowchart illustrating an interfacing method consistent with an exemplary embodiment of the present invention.

FIG. 7 is a flowchart illustrating an interfacing method according to an exemplary embodiment of the present invention.

First, the controller 140 determines whether 3D motion of a user is sensed by the 3D camera sensor 130 or not (S710).

If the user motion is sensed (S710-Y), the controller 140 determines motion information such as direction, speed, position, scale, and shape of the sensed motion (S720).

The controller 140 refers to the lookup table with the motion information (S730) and determines the wind property corresponding to the sensed motion (S740).

The controller 140 controls the wind generation module 150 to generate a wind according to the determined property (S750).

The wind generation module 150 exhausts the wind through the exhaust hole (not shown) (S760).

As described above, the interface apparatus 100 allows the user to manipulate the 3D interface more easily and conveniently and allows the user to intuitively learn the result of 3D interface manipulation.

Accordingly, the user can manipulate the 3D interface more easily and can intuitively learn the result of 3D interface manipulation.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An interface apparatus operable with motion, the interface apparatus comprising:
    a motion sensor for sensing motion of a plurality of objects;
    a controller configured to determine a pattern of the motion based on the sensing, the pattern comprising a direction, speed, scale, position, and shape of the objects;
    a wind generation module for generating a wind feedback including a property corresponding to the pattern of the motion, the property comprising a wind strength scale, a temperature or direction,
    wherein the wind generation module generates a first wind feedback including a first property corresponding to a first pattern of the motion, and a second wind feedback including a second property corresponding to a second pattern of the motion; and
    a display unit, wherein the controller changes a scene displayed on the display unit based on the motion.

2. The interface apparatus as claimed in claim 1, wherein the generated wind feedback further comprises a property regarding at least one smell and component.

3. The interface apparatus as claimed in claim 1, wherein the motion sensor is disposed at one side of the display unit to sense the motion in a 3D space formed above another side of the display unit.

4. The interface apparatus as claimed in claim 1, wherein the controller determines the direction of the motion based on a scene output on the display unit.

5. The interface apparatus as claimed in claim 1, wherein the motion is a plurality of motions,
wherein the controller determines the direction of the motion based on the plurality of motions of the plurality of objects.

6. The interface apparatus as claimed in claim 1, further comprising a storage unit which stores the direction of the wind corresponding to the motion,
wherein the controller generates the wind based on the stored direction of the wind.

7. An interfacing method which is performed based on motion sensed by a motion sensor, the method comprising:
sensing motion of a plurality objects;
determining a pattern of the motion based on the sensing, the pattern comprising a direction, speed, scale, position, and shape of the objects;
generating a wind feedback including a property corresponding to the pattern of the motion, the property comprising a wind strength scale, a temperature or direction,
wherein the wind feedback includes a first wind feedback including a first property corresponding to a first pattern of the motion, and a second wind feedback including a second property corresponding to a second pattern of the motion; and
displaying a scene on a display unit, wherein the controller changes a scene displayed on the display unit based on the motion.

8. The interfacing method as claimed in claim 7, wherein the generated wind feedback further comprises a property regarding at least one of smell and component.

9. The interfacing method as claimed in claim 7, wherein the determining operation determines the direction of the motion based on a scene output on the display unit.

10. The interfacing method as claimed in claim 7, wherein the motion is a plurality of motions,
wherein the determining operation determines the direction of the motion based on the plurality of motions of the plurality of objects.

11. The interfacing method as claimed in claim 7, wherein the direction of the wind is a pre-stored property corresponding to the motion.

12. An interface method based on hand gestures, the method comprising:
sensing motion of a hand gesture;
determining a pattern of the motion based on the sensing, the pattern comprising a direction, speed, scale, position, and shape of the hand gesture, by comparing the sensed hand gesture motion with a predetermined lookup table of a plurality of hand gestures; and
blowing air feedback including a property corresponding to the pattern of the motion, the property comprising a wind strength scale, a temperature or direction,
wherein the air feedback includes a first wind feedback including a first property corresponding to a first pattern of the motion, and a second wind feedback including a second property corresponding to a second pattern of the motion; and
displaying a scene on a display unit, wherein the controller changes a scene displayed on the display unit based on the motion.

13. The interface method of claim 12, wherein the hand gesture is a hand gesture of a user in three-dimensional space.

14. The interface method of claim 13, wherein the sensed hand gesture is at least one of a static gesture and a dynamic gesture.

15. The interface method of claim 14, wherein the hand gesture comprises a finger gesture.

16. The interface method of claim 14, wherein the blowing the air is performed at least adjacent to a display.

* * * * *